(12) United States Patent  
Greene et al.

(10) Patent No.: US 7,916,850 B2  
(45) Date of Patent: Mar. 29, 2011

(54) IMS SUBSCRIBER ACCESS CONTROL

(75) Inventors: Nancy Greene, Montreal (CA); Sorin Surdila, Laval (CA); Christophe Gourraud, Montreal (CA); Peter Postmus, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1134 days.

(21) Appl. No.: 10/571,103

(22) PCT Filed: Aug. 31, 2004

(86) PCT No.: PCT/EP2004/051978  
§ 371 (c)(1),  
(2), (4) Date: Dec. 18, 2006

(87) PCT Pub. No.: WO2005/027459  
PCT Pub. Date: Mar. 24, 2005

(65) Prior Publication Data  
US 2007/0217394 A1    Sep. 20, 2007

(30) Foreign Application Priority Data  
Sep. 12, 2003    (GB) .................................. 0321414.5

(51) Int. Cl.  
*H04M 3/42* (2006.01)
(52) U.S. Cl. .......... 379/207.02; 379/142.03; 379/142.05
(58) Field of Classification Search .................. 370/352; 713/202  
See application file for complete search history.

(56) References Cited

FOREIGN PATENT DOCUMENTS  
WO    WO 03/056781    7/2003

OTHER PUBLICATIONS

"Digital cellular telecommunications system (Phase 2+); Universal Mobile Telecommunications System (UMTS); IP Multimedia (IM) session handling; IM call model; Stage 2 (3GPP TS 23.218 version 5.5.0 Release 5); ETSI TS 123 218" ETSI Standards, European Telecommunications Standards Institute, Sophia-Antipo, FR, vol. 3-CN1, No. V550, Jun. 2003, XP014007861 ISSN: 0000-0001 pp. 7-8 pp. 11-19 pp. 34-37.

3GPP, 3$^{rd}$ Generation Partnership Project: Technical Specification Group Core Network and Terminals; IP Multimedia (IM) Subsystem CX and DX Interfaces; Signalling Flows and Message Contents (Release 5), 3GPP TS 29,228 v5.16.0 (Jun. 2006), Sophia Antipolls France.

Rosenburg, et al. SIP: Session Initiation Protocol. Network Working Group. Request for Comments: 3261. Jun. 2002.

*Primary Examiner* — Curtis Kuntz  
*Assistant Examiner* — Joseph J Nguyen

(57) ABSTRACT

A method of controlling subscriber access to SIP-based services facilitated by an IP Multimedia Subsystem. The method comprises defining at a Serving Call Session Control Function node at least one default screening trigger, and downloading from a Home Subscriber Subsystem, specific screening triggers allocated to at least certain subscribers. At the Serving Call Session Control Function node, at least certain SIP messages originating at subscriber terminals are intercepted and, for each intercepted message and in the absence of a matching specific screening trigger, the default trigger is activated so as to cause the SIP message to be forwarded to a specific SIP application service.

5 Claims, 3 Drawing Sheets

IMS SUBSCRIBER ACCESS CONTROL

FIELD OF THE INVENTION

The present invention relates to combinational multimedia services and more particularly though not necessarily to a method of establishing combinational multimedia sessions between parties.

BACKGROUND TO THE INVENTION

IP Multimedia (IPMM) services provide a dynamic combination of voice, video, messaging, data, etc. within the same session. By growing the numbers of basic applications and the media which it is possible to combine, the number of services offered to the end users will grow, and the interpersonal communication experience will be enriched. This will lead to a new generation of personalised, rich multimedia communication services, including so-called "combinational IP Multimedia" services which are considered in more detail below.

IP Multimedia Subsystem (IMS) is the technology defined by the Third Generation Partnership Project (3GPP) to provide IP Multimedia services over 3G mobile communication networks. IMS sits on top of an access network which would typically be a General Packet Radio Service (GPRS) network but which might use some alternative technology, e.g. WiFi. FIG. 1 illustrates schematically how the IMS fits into the mobile network architecture in the case of a GPRS access network.

IMS provides key features to enrich the end-user person-to-person communication experience through the Integration and interaction of services. IMS allows new rich person-to-person (client-to-client) as well as person-to-content (client-to-server) communications over an IP-based network. So-called Serving Call Session Control Function (S-CSCF) nodes within the IMS are responsible for setting up and controlling calls and sessions between user terminals (or user terminals and web servers) using Session Initiation Protocol (SIP) and Session Delivery Protocol (SDP). The S-CSCF communicates with SIP application servers (ASs) which are responsible for authorising service use.

An example of a combinational IP Multimedia service is a multimedia service that includes and combines both a Circuit Switched media (such as voice) and a Packet Switched media over the IP Multimedia domain (such as pictures, video, presence, instant messages, etc.). A service referred to here as "WeShare" combines the full IP Multimedia Subsystem (IMS) benefits of a multimedia service with CS voice. The service enables a user, during a Circuit Switched (CS) voice conversation with another user, to take a picture, a video or audio clip, etc. and to share this content with other users in (near) real time. Either party in the conversation may initiate transmission of content to the other party.

The WeShare service may be the only IMS service an operator wants to allow in its network even though some user terminals may have general SIP technology installed (an operator may even want to restrict the WeShare service to the WeShare Image service in which users are only able to exchange still photos during a CS voice call). Furthermore, network operators may want to register subscribers on a per service basis. However, if a terminal has a SIP Client, and if the user has an IMS subscription, then today there is nothing preventing that SIP Client from setting up a SIP session requesting audio, video and/or data (effectively bypassing the WeShare SIP AS), even if the operator does not want these kind of general sessions to be created and/or the subscriber has not registered for the necessary services. This problem applies also to combinational services other than WeShare and indeed to non-combinational SIP-based services.

SUMMARY OF THE INVENTION

According to a first aspect of the present invention there is provided a method of controlling subscriber access to SIP-based services facilitated by an IP Multimedia Subsystem, the method comprising:
- defining at a Serving Call Session Control Function node at least one default screening trigger;
- downloading from a Home Subscriber Subsystem, specific screening triggers allocated to at least certain subscribers; and
- intercepting at the Serving Call Session Control Function node, at least certain SIP messages originating at subscriber terminals, and for each intercepted message, in the absence of a matching specific screening trigger, activating the default trigger so as to cause the SIP message to be forwarded to a specified SIP application server.

The SIP-based services to which access is controlled by the triggers may be combinational multimedia services.

The default trigger may be applied to all subscribers of an operator's network, or to one or more sub-classes of subscriber.

At said SIP application server, it may be determined whether or not a subscription exists to the service to which the forwarded SIP message relates and, if not, access to the requested service is denied, or possibly access is allowed for some specified period of time. If a subscription does exist, the SIP message may be returned to the Serving Call Session Control Function node or forwarded to the next service node scheduled to handle the SIP message.

The Serving Call Session Control Function node (S-CSCF) and SIP application server (AS) may be located in the home network of the originating subscriber or in the home network of a terminating subscriber. In the former case, said subscription will be a subscription of the originating subscriber, whilst in the latter case the subscription will be a subscription of the terminating subscriber.

Embodiments of the present invention define the concept of a generic IMS screening function. At least for a given SIP message type, e.g. INVITE, a SIP message will always match a trigger at the originating or terminating S-CSCF. If the message matches no other trigger, It will match the IMS default trigger, causing the SIP message to be forwarded to the SIP AS hosting the screening function that will check for subscription/authorisation. The default trigger can be set for all IMS message types, or it can be set only for specific IMS message, e.g. INVITE messages (used to initiate an IMS function).

If no WeShare Image subscription exists for a given SIP message, or if no general IMS functionality subscription exists, the IMS screening function will send a final response to stop the request, otherwise it will allow the request to proceed to the terminating user. This may be especially useful for terminating services: user A may be authorised/subscribed to use a service, while user B may not be. Depending on the service and on operator configuration, user B may or may not be allowed to receive results of a service to which user A has a subscription.

The invention provides the operator with full control over how the IMS network is used, and ensures that appropriate charging functions will be invoked, both on the originating and terminating side.

According to a second aspect of the present invention there is provided a Serving Call Session Control Function node for use in an IP Multimedia Subsystem, the Serving Call Session Control Function node comprising:

memory means for storing at least one default screening trigger;

memory means for storing specific screening triggers allocated to at least certain subscribers and means for downloading these specific screening triggers from a Home Subscriber Subsystem;

processing means for intercepting at least certain SIP messages originating at subscriber terminals, and for each intercepted message, in the absence of a matching specific screening trigger, for activating the default trigger so as to cause the SIP message to be forwarded to a specified SIP application server.

DETAILED DESCRIPTION OF THE INVENTION

Figure 1:
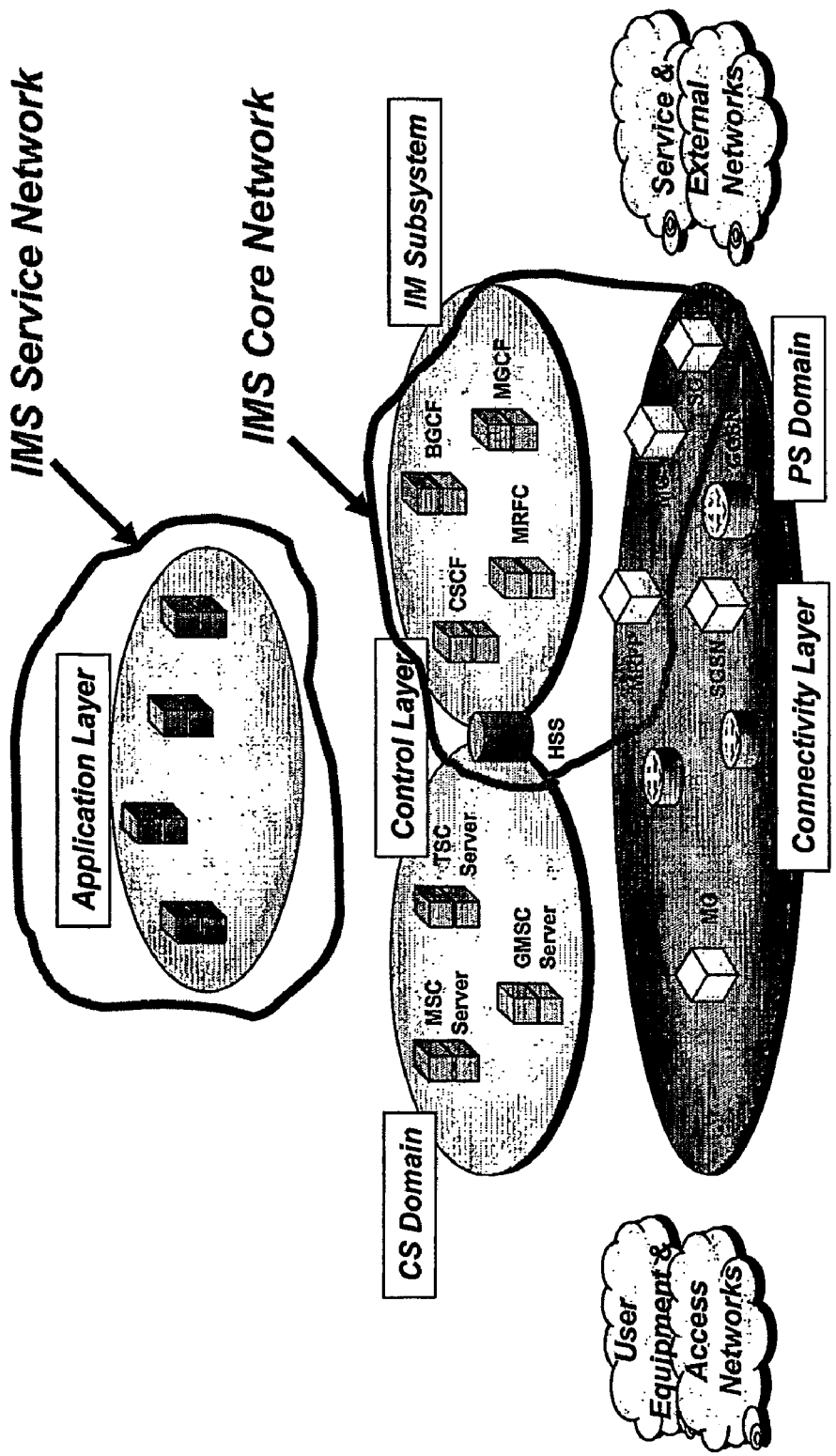
FIG. 1 illustrates schematically the IMS architecture within a communications network architecture.

The Third Generation Partnership Project (3GPP) IMS specifications introduce and define the general concept of SIP message triggers (3GPP specification 23.218 and CX specifications 29.228). These triggers are also referred to as Initial Filter Criteria or IFC. Typically, a network operator will define one or more specific screening triggers for each subscriber that is registered for an IMS service. These are stored in the operator's Home Subscriber Server (HSS), and are downloaded to the Serving Call Session Control Function (S-CSCF) node upon SIP registration of a subscriber. This node may change depending for example upon the location of the subscriber. An example of a screening trigger may be: "method=INVITE, session case=originating and terminating, AS=AS1".

Such a trigger will cause the S-CSCF to route all SIP messages of type INVITE for a given subscriber, to application server AS1. Application server AS1 then processes the INVITE message according to some predefined procedure.

In the absence of a suitable control mechanism, if no specific trigger exists at the S-CSCF for a given subscriber and message type, the S-CSCF will allow uncontrolled access to the IMS service. It is proposed here to introduce one or more default screening triggers which will allow a mobile network operator to control the access of its subscribers to SIP services. As a specific example, if the operator does not want users to directly contact other users using the SIP INVITE message procedure, the operator would introduce at the appropriate S-CSCF and for each user, a screening trigger having the properties: "method=INVITE, session case =originating and terminating, AS=AS*", where "*" identifies the particular application server to which the INVITE message should be sent. This trigger would cause the S-CSCF to route any SIP INVITE addressed to that user, or sent from that user, to a SIP application server responsible for authorising SIP service access. This procedure would be required when, for example, an operator allows SIP MESSAGE to be used in his network directly between users, but not SIP INVITE.

Upon SIP registration, any specific screening triggers defined for a particular subscriber are downloaded to the S-CSCF from the HSS. When a SIP message is received at the S-CSCF from the subscriber's terminal, a check is first made to determine whether the message matches any downloaded specific trigger defined for the relevant message type. An example of a specific trigger is:
"method=INVITE, session case=originating and terminating, AS=AS2".

If a match occurs, appropriate action is taken, e.g. the S-CSCF forwards the message to the application server AS2. Only if the SIP message does not match one of the specific triggers is the default trigger activated. A default trigger might be:
"method=INVITE, session case=originating and terminating, AS=AS2".

In some cases, the SIP AS to which a default trigger causes a SIP message to be sent, may determine that a subscriber is not registered for a service and may reject a service request. In other cases, the AS may recognise that a subscriber is eligible for a temporary access (e.g. trial period), and may allow the request whilst at the same time starting a timer, e.g. set to run for 10 days. During that period, further requests are allowed, whilst requests received after the timer has expired are rejected. In the meantime of course, the subscriber may have registered for the particular service in which case an appropriate specific trigger will have been stored for the subscriber in the HSS.

Figure 2:
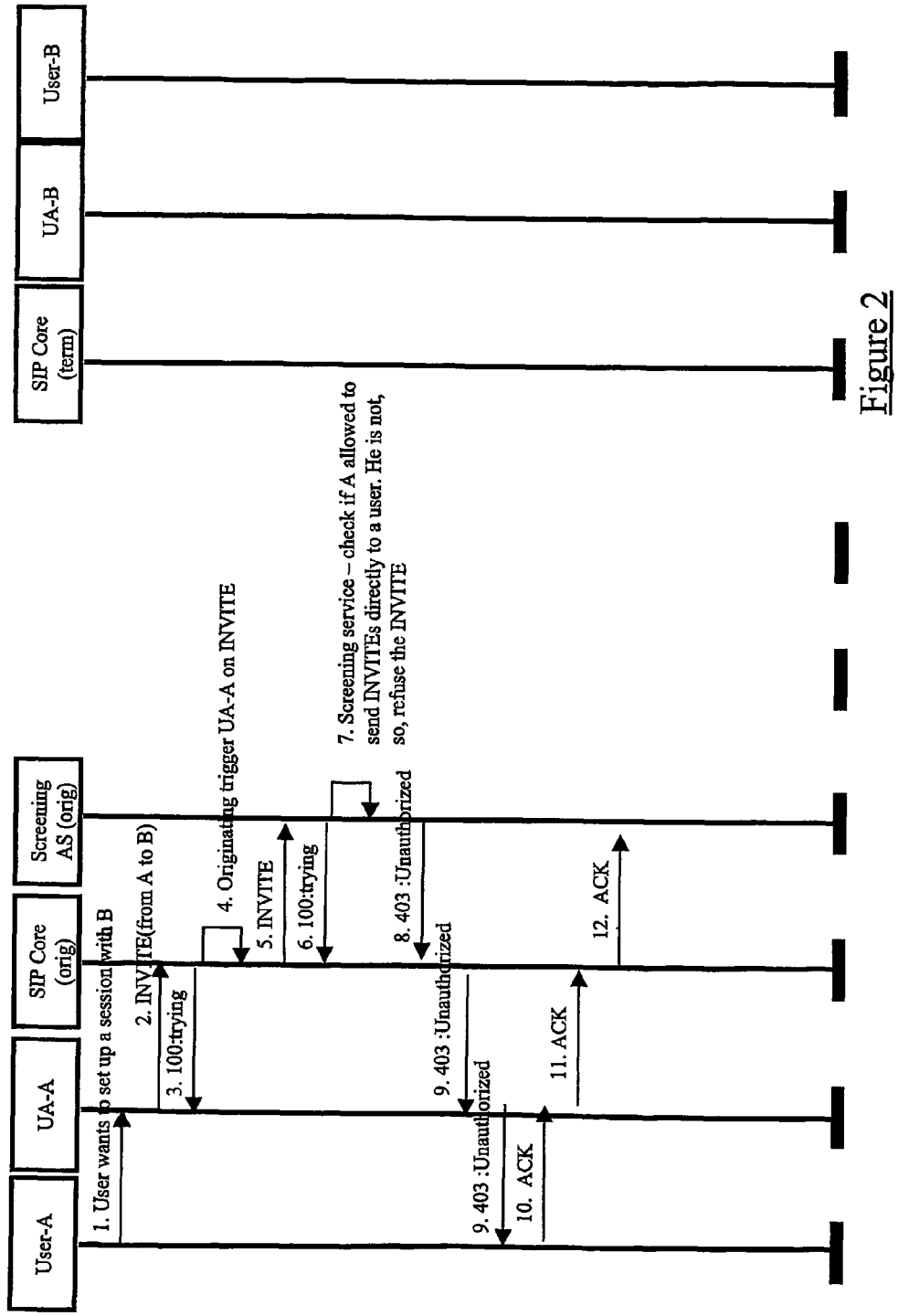
FIG. 2 illustrates signalling associated with a SIP INVITE procedure according to a first use scenario.
Figure 3:
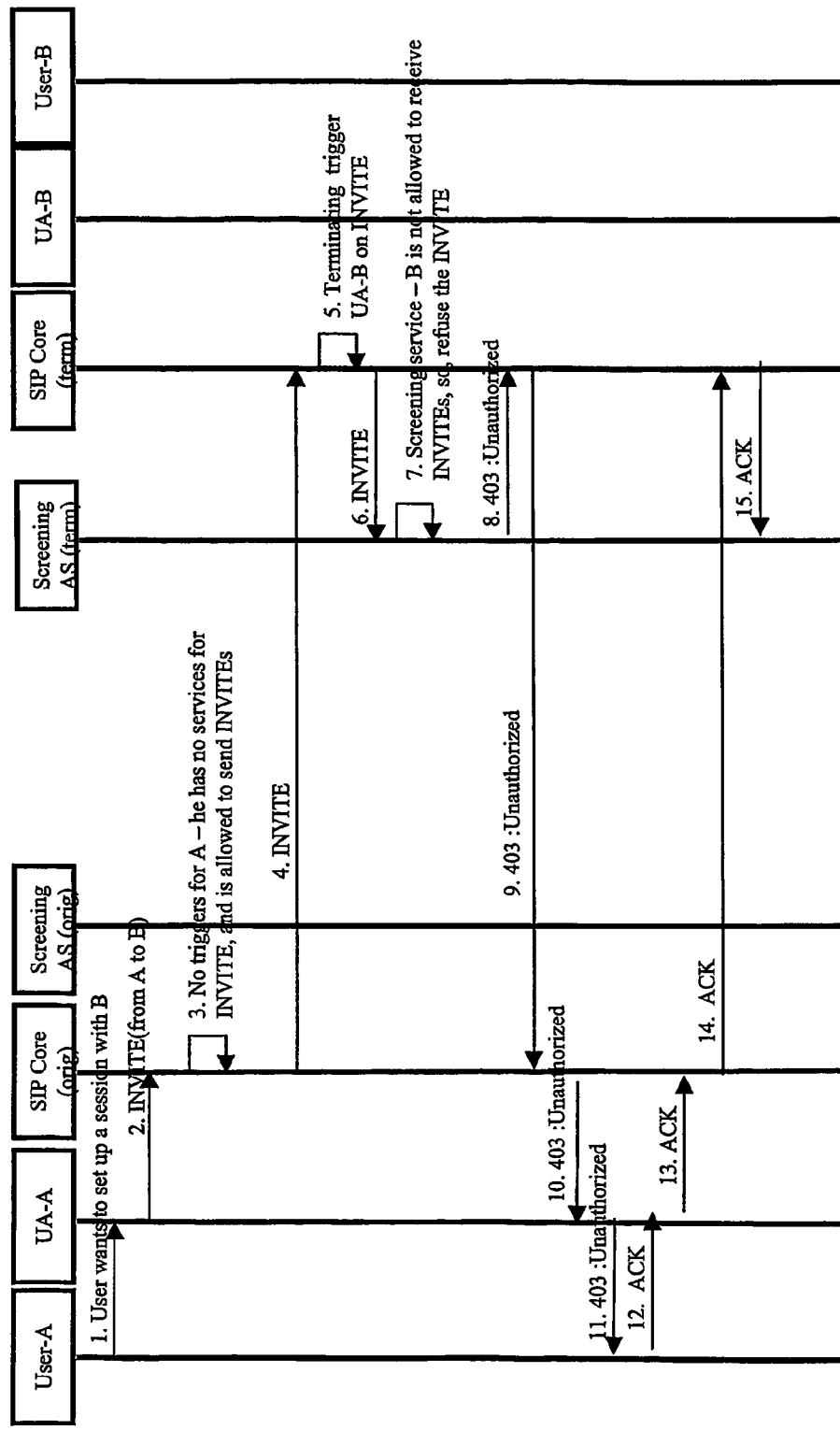
FIG. 3 illustrates signalling associated with a SIP INVITE procedure according to a second use scenario

FIG. 2 illustrates the signalling associated with a scenario in which a user A tries to initiate a SIP session with a user B using the SIP INVITE (steps 1 and 2). The SIP Core (S-CSCF) is programmed with a default screening trigger (with no overriding specific triggers) which causes the received SIP INVITE request to be forwarded to a SIP AS for screening (steps 4 and 5). At step 7, the SIP AS examines a subscriber service database, and determines that user A is not authorised for this service. An "unauthorised" response is therefore returned to user A (steps 9 and 10) and the service request is not allowed to proceed. In the scenario of FIG. 3, user A again initiates the SIP INVITE procedure. This time, the S-CSCF of his operator's SIP core is not programmed with any relevant screening triggers (default or specific). The INVITE is therefore forwarded to the SIP core of user B's operator network. The S-CSCF there is programmed with a default screening trigger which causes the SIP INVITE request to be forwarded to the relevant SIP AS. This AS determines that user B is not authorised for this service, and causes an "unauthorised" response to be returned to user A. Again, the service request is not allowed to proceed.

REFERENCES

SIP RFC3261

The invention claimed is:

1. A method of controlling subscriber access to SIP-based services facilitated by an IP Multimedia Subsystem, the method comprising:

defining at a Serving Call Session Control Function node a default screening trigger applied to all IMS subscribers in a network, wherein said default trigger is applied only to SIP messages of the INVITE type;

downloading from a Home Subscriber Subsystem, specific screening triggers allocated to at least certain IMS subscribers; and intercepting at the Serving Call Session Control Function node, at least certain SIP messages originating at subscriber terminals, and for each intercepted message, in the absence of a matching specific screening trigger, activating the default trigger so as to cause the SIP message to be forwarded to a specified SIP application server, wherein the Serving Call Session Control Function node and SIP application server (AS) are located in a home network of the originating subscriber or in a home network of a terminating subscriber.

2. A method according to claim 1, the SIP-based services to which access is controlled by the triggers comprising combinational multimedia services.

3. A method according to claim 1 and comprising determining at said SIP application server whether or not a subscription exists to the service to which the forwarded SIP message relates and, if not, denying access to the requested service.

4. A method according to claim 1 and comprising determining at said SIP application server whether or not a subscription exists to the service to which the forwarded SIP message relates and, if not, allowing access for some specified period of time.

5. A Serving Call Session Control Function node for use in an IP Multimedia Subsystem, the Serving Call Session Control Function node comprising:

memory means for storing a default screening trigger applied to all IMS subscribers in a network, wherein said default trigger is applied only to SIP messages of the INVITE type;

memory means for storing specific screening triggers allocated to at least certain IMS subscribers and means for downloading these specific screening triggers from a Home Subscriber Subsystem; and processing means for intercepting at least certain SIP messages originating at subscriber terminals, and for each intercepted message, in the absence of a matching specific screening trigger, for activating the default trigger so as to cause the SIP message to be forwarded to a specified SIP application server, wherein the Serving Call Session Control Function node and SIP application server (AS) are located in a home network of the originating subscriber or in a home network of a terminating subscriber.

* * * * *

UNITED STATES PATENT AND TRADEMARK OFFICE
CERTIFICATE OF CORRECTION

| | | |
|---|---|---|
| PATENT NO. | : 7,916,850 B2 | Page 1 of 1 |
| APPLICATION NO. | : 10/571103 | |
| DATED | : March 29, 2011 | |
| INVENTOR(S) | : Greene et al. | |

It is certified that error appears in the above-identified patent and that said Letters Patent is hereby corrected as shown below:

On the Title Pg, Item (56), under "OTHER PUBLICATIONS", Line 6, delete "3CNl, and, insert -- 3CN1 --, therefor.

On the Title Pg, Item (56), under "OTHER PUBLICATIONS", Line 11, delete "29,228" and insert -- 29.228 --, therefor.

In Column 1, Line 10, delete "TO" and insert -- OF --, therefor.

In Column 1, Line 32, delete "Integration" and insert -- integration --, therefor.

In Column 2, Line 47, delete "It" and insert -- it --, therefor.

In Column 3, Line 57, delete "INVITE," and insert -- INVITE, --, therefor.

In Column 5, Line 9, in Claim 3, after "claim 1" delete "and".

In Column 5, Line 14, in Claim 4, after "claim 1" delete "and".

Signed and Sealed this
Eighth Day of November, 2011

David J. Kappos
*Director of the United States Patent and Trademark Office*